United States Patent
Berckmans et al.

(10) Patent No.: US 8,686,132 B2
(45) Date of Patent: Apr. 1, 2014

(54) MICROPROCESSING IN HETEROGENEOUS REACTION MIXTURES

(75) Inventors: Marc Charles Florent Berckmans, Brussels (BE); Rita Maria Delrue, Mechelen (BE); Bruno Frédéric Stengel, Auderghem (BE)

(73) Assignee: Cargill, Incorporated, Wayzata, MN (US)

( * ) Notice: Subject to any disclaimer, the term of this patent is extended or adjusted under 35 U.S.C. 154(b) by 69 days.

(21) Appl. No.: 13/394,860

(22) PCT Filed: Aug. 19, 2010

(86) PCT No.: PCT/EP2010/005090
§ 371 (c)(1), (2), (4) Date: Mar. 8, 2012

(87) PCT Pub. No.: WO2011/029518
PCT Pub. Date: Mar. 17, 2011

(65) Prior Publication Data
US 2012/0172586 A1    Jul. 5, 2012

(30) Foreign Application Priority Data
Sep. 10, 2009  (EP) .................................... 09011597

(51) Int. Cl.
*C07H 1/00*     (2006.01)
*C07H 3/00*     (2006.01)
*C08B 37/00*    (2006.01)

(52) U.S. Cl.
USPC .......................................................... 536/124

(58) Field of Classification Search
None
See application file for complete search history.

(56) References Cited

FOREIGN PATENT DOCUMENTS

WO   2005/023873   3/2005
WO   2011/029518   3/2011

OTHER PUBLICATIONS

Corn Refiners Association, Corn Starch, 2006, pp. 1-39.*
Carpenter, Microreactors and Microfluidic Cells in Organic Synthesis, Dec. 12, 2007.*
Melander C et al.; "Hydrolysis of maltoheptaose in flow through silicon wafer microreactors containing immobilised [alpha]-amylase and glycoamylase"; May 2006; vol. 58; NR, 5; pp. 232-242, Paragraphs [02.4], [03.8] XP002568088.
Melander C et al.; "'Microchip immobilized enzyme reactors for hydrolysis of methyl cellulose"; May 15, 2005, Analytical Chemistry 20050515 American Chemical Society US; vol. 77; NR 10, pp. 3284-3281, XP002568087.

* cited by examiner

*Primary Examiner* — Layla Bland

(57) ABSTRACT

The present invention relates to a process for preparing a chemically modified polysaccharide, preferably starch, by using a microdevice. It further relates to the use of a microdevice for the chemical reactions of polysaccharides in heterogeneous mixtures. Examples of chemical modifications are acetylation, oxidation, hydroxypropylation and the like.

12 Claims, No Drawings

MICROPROCESSING IN HETEROGENEOUS REACTION MIXTURES

CROSS-REFERENCE TO RELATED APPLICATIONS

This application claims benefit of international application PCT/EP2010/005090, filed Aug. 19, 2010, which application claims priority to European Application 09011597.3, filed Sep. 10, 2009, which applications are hereby incorporated by reference herein in their entirety.

FIELD OF THE INVENTION

The present invention relates to a process for preparing a chemically modified polysaccharide, preferably starch by using a microdevice.

BACKGROUND OF THE INVENTION

In order to continually improve physical standards of living for greater number of people, it is necessary to achieve more results with fewer resources. Therefore there is the tendency towards building and manufacturing smaller-scale products due to the desire for size efficiency. Most recently, scientists have learned that not only electronic devices, but also mechanical devices, may be miniaturized and batch-fabricated, promising the same benefits to the mechanical world as integrated circuit technology has given to the electronic world.

In general, the benefits of miniaturized systems have been recognized but there is still a need for further developing the use of these systems in chemical reactions of heterogeneous mixtures.

SUMMARY OF THE INVENTION

The current invention relates to a process for preparing a chemically modified polysaccharide and said process is comprising the following steps:
 a) Taking a slurry comprising polysaccharide
 b) Adjusting pH to allow a chemical reagent reacting with the polysaccharide in the slurry of step a),
 c) Injecting the slurry through a microdevice
 d) Adding through the microdevice a chemical reagent selected from the group consisting of an cross-linking agent, an esterification agent, etherification agent, oxidation agent and a mixture of two or more thereof, to react with the polysaccharide in the slurry of step a)
 e) Collecting chemically modified polysaccharide Furthermore the current invention relates specifically to a process wherein the polysaccharide is starch.

The current invention further relates to the use of microdevice for the chemical reaction of polysaccharides with a chemical reagent selected from the group consisting of an cross-linking agent, an esterification agent, etherification agent, oxidation agent and a mixture of two or more thereof, in an heterogeneous medium.

DETAILED DESCRIPTION

The current invention relates to a process for preparing a chemically modified polysaccharide and said process is comprising the following steps:
 a) Taking a slurry comprising polysaccharide
 b) Adjusting pH to allow a chemical reagent reacting with the polysaccharide in the slurry of step a),
 c) Injecting the slurry through a microdevice
 d) Adding through the microdevice a chemical reagent selected from the group consisting of an cross-linking agent, an esterification agent, etherification agent, oxidation agent and a mixture of two or more thereof, to react with the polysaccharide in the slurry of step a)
 e) Collecting chemically modified polysaccharide Polysaccharide is selected from the group consisting of hydrocolloids, cellulose, cellulose derivatives, starch, starch derivatives, manno-oligosaccharides, xylo-oligosaccharides, polydextrose, partially depolymerized fibers such as soluble cocoa fiber, soluble fiber of guar gum, beta-glucan, and mixtures of two or more.

Hydrocolloids are selected from the group consisting of alginate, pectin, xanthan gum, guar gum, locust bean gum, carrageenan, derivatives and mixtures of two or more.

Alginate are produced by seaweeds and are linear unbranched polymers containing $\beta$-(1-4)-linked D-mannuronic acid and $\alpha$-(1-4)-linked L-guluronic acid residues. Alginates consist of blocks of similar and strictly alternating residues.

Pectin is a heterogenous grouping of acid is structural polysaccharides found in fruit and vegetables and mainly prepared from waste citrus peel and apple pomace. Pectin has a complex structure, and a large part of the structure consists of homopolymeric partially methylated poly-alpha-(1-4)-D-galacturonic acid residues with substantial hairy non-gelling areas of alternating alpha-(1-2)L-rhamnosyl-alpha-(1-4)-D-galacturonosyl sections containing branch points with mostly neutral side chains (1-20 residues) of mainly L-arabinose and D-galactose. The properties of pectins depend on the degree of esterification, which is normally about 70%. The low-methoxy pectins are <40% esterified, while high-methoxy pectins are >43% esterified, usually 67%. Amidated pectin is also a suitable candidate.

Xanthan gum is a microbial desiccation resistant polymer prepared commercially by aerobic submerged fermentation. It is naturally produced to stick bacteria to the leaves of cabbage-like plants. Xanthan gum is an anionic polyelectrolyte with a beta-(1-4)-D-glucopyranose glucan backbone with is de chains of (3-1)-alpha-linked D-mannopyranose(2-1)-beta-D-glucuronic acid-(4-1)-$\beta$-D-mannopyranose on alternating residues. Slightly less than half of the terminal mannose residues are 4,6-pyruvated and the inner mannose is mostly 6-acetylated. Each molecule consists of about 7000 pentamers and the gum is less polydisperse than most hydrocolloids.

Guar gum is a galactomannan consisting of a (1-4)-linked beta-D-mannopyranose backbone with branch-points from their 6-positions linked to a-D-galactose. There are between 1.5 to 2 mannose residues for every galactose residue. Guar gum is made up of non-ionic polydisperse rod-shaped polymers consisting of molecules made up of about 10,000 residues. Guar gum is highly water-soluble and e.g. more soluble than locust bean gum.

Locust bean gum is a galactomannan similar to guar gum. It is polydisperse and consists of non-ionic molecules made up of about 2000 residues. Locust bean gum is less soluble and has lower viscosity than guar gum as it has fewer galactose branch points. It needs heating to dissolve but is soluble in hot water.

Carrageenan is a collective term for polysaccharides prepared by alkaline extraction from red seaweed. The basic structure of carrageenan consists of alternating 3-linked-beta-D-galactopyranose and 4-linked-alpha-D-galactopyranose units. The regular backbone structure of the basic structure of carrageenan is disrupted by a more or less ordered distribution of sulphate ester groups. Carrageenan can also contain same methoxy and pyruvate groups. Carrageenans are linear polymers of about 25,000 galactose derivatives.

Cellulose is an aggregate of linear polymers of D-glucopyranosyl residues in the chain form, which are linked together entirely in the beta-1,4 configuration. Cellulose and cellulose derivatives include microcrystalline cellulose, microfribillated cellulose, cellulose ethers such as carboxymethyl cellulose hydroxypropylmethyl cellulose, methyl cellulose, ethyl methyl cellulose, hydroxypropyl cellulose and the like.

Beta-glucan occurs in the bran of grains such as barley, oats, rye and wheat. Beta-glucans, typically consists of linear unbranched polysaccharides of linked β-(1-3) D-glucopuranose units in a random order.

Polydextrose is a food ingredient classified as soluble dietary fiber and is frequently used to increase the non-dietary fiber content of food, to replace sugar, reduce calories and reduce fat content. It is a multi-purpose food ingredient synthesized from dextrose, potentially plus about 10 percent sorbitol and 1 percent citric acid.

Partially depolymerized fibers are depolymerized heteropolysaccharides having a molecular weight of less than 10,000 and having an average degree of polymerization (DP) of 3 to 30.

Any suitable polysaccharide for the current invention is a polysaccharide which is either not soluble in water (cold or hot) or which provides a slurry, dispersion, or a suspension either with low or high dry substance and is thus resulting in a heterogeneous mixture.

Starch is a mixture of two molecular entities, namely amylose and amylopectin. Amylose is the starch polysaccharide that primarily consists of long chained alpha-1,4-linked D-glucose molecules with a DPn between about 500-5000. Amylopectin consists of relatively short chain alpha-1,4-linked D-glucose molecules interconnected by many alpha-1,6-branch points (approximately 1/25). The molecular weight of amylopectin molecules is in the range of several millions. The amylopectin/amylose ratio can vary between 100:0 and 10:90 depending on the plant source.

Preferably the polysaccharide of the current invention is a starch or starch derivative.

The starches can be derived from any native source, wherein native relates to the fact that said starch is found in nature. Unless specifically distinguished, references to starch in this description are meant to include their corresponding flours, which are still containing proteins, such as wheat gluten (hereinafter "starch"). Typical sources for the starches are cereals, tubers, roots, legumes, fruit starches and hybrid starches. Suitable sources include but are not limited to corn, pea, potato, sweet potato, sorghum, banana, barley, wheat, rice, sago, amaranth, tapioca, arrowroot, canna, and low amylose (containing no more than about 10% by weight amylose, preferably no more than 5%) or high amylose (containing at least about 40% by weight amylose) and varieties thereof. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition, which may be produced by, known standard methods of mutation breeding are also suitable herein. Modifications are intended to include chemical modifications and physical modifications. The chemical modifications are intended to include without limitation crosslinked starches, acetylated starches, hydroxyethylated and hydroxypropylated starches, inorganically esterified starches, cationic, anionic, oxidized starches, zwitterionic starches, starches modified by enzymes, and combinations thereof, provided that the starches are not fully dissolved in the liquid medium and provide a slurry of suspended particles. Physically modified starches such as thermally inhibited starches as disclosed for example in EP Patent No. 1 038 882 may also be suitable for use herein. It is to be understood that mixtures of any of the above mentioned starches and/or flours are also within the scope of this invention. For the sake of simplicity, any reference herein to starch, starch derivative or starch substrate will be understood to include one or several kinds of native starch, and/or starch derivatives.

Microdevice or microreactors are usually defined as miniaturized reaction vessels fabricated at least partially, by methods of microtechnology and precision engineering. The characteristics dimensions of the internal structure of microreactor fluid channels can vary substantially, but typically range from the sub-micrometer to the sub-millimeter range. Microreactors most often are designed with microchannel architecture. These structures contain a large number of parallel channels and each microchannel is used to convert a small amount of material. However, the structures should not be limited to a construction of parallel channels.

The benefits of miniaturized systems, designed with dimensions similar to microreactors (microdevice), compared to a large scale process include but are not limited to large scale batch process can be replaced by a continuous flow process, smaller devices need less space, fewer materials less energy and often shorter response times and system performance is enhanced by decreasing the component size, which allows integration of a multitude of small functional elements. Consequently, microreactors (microdevices) significantly intensify heat transfer, mass transport, and diffusional flux per unit volume or unit area.

Typical thickness of the fluid layer in a microreactor can be set to few tens of micrometers (typically from about 10 to about 500 μm) in which diffusion plays a major role in the mass/heat transfer process. Due to a short diffusional distance, the time for a reactant molecule to diffuse through the interface to react with other molecular species is reduced to milliseconds and in some cases to nanoseconds. Therefore the conversion rate is significantly enhanced and the chemical reaction process appears to be more efficient.

Surprisingly, it was found that the microdevice is having a beneficial effect on the chemical modification of polysaccharides while they are occurring in heterogeneous mixtures.

The adjustment of pH (also the activation step) can be done in any vessel but might occur in the microdevice as well. Before injecting the slurry through the microdevice, the slurry can be heated by using a micro-heat-exchanger. The adjustment of pH will allow a chemical reagent which is selected from the group consisting of a cross-linking agent, an esterification agent, etherification agent, oxidation agent and a mixture of two or more thereof, to react with the polysaccharide in the slurry.

Chemical reagent, is preferably added in liquid form, such as a liquid chemical reagent or a solid chemical reagent dissolved or dispersed into a liquid medium. The chemical reagent can be provided in concentrated or diluted form.

The chemical reagent is selected from the group consisting of a cross-linking agent, an esterification agent, etherification agent, oxidation agent and a mixture of two or more thereof.

The cross-linking agent is selected from the group consisting of dichloropropylene (DCP), phosphorylation agent, adipylation, in general any di-acid or tri-acid like fumaric acid or maleic acid, and/or their corresponding anhydrides is a suitable cross-linking agent.

The etherification agent is selected from hydroxypropylation agent, ethylation agent and/or cationisation reagent. Reagents such as propylene oxide, ethylene oxide, butylene oxide, epichlorohydrin, cationic reagent and the like are suitable chemical agents for the current invention. Preferably the etherification is hydroxypropylation in presence of propylene oxide.

The esterification agent is selected from acetylation agent, n-ocetylation agent, and the like. Suitable reagent can be any methyl, or ethyl ester, oils, e.g. triglycerides and/or organic acids. The concept of the use of microdevice for the chemical medication of heterogeneous mixtures has particularly been demonstrated by applying acetic anhydride for the acetylation of starch.

The oxidation agent is selected from the group consisting of hydrogen peroxide, hypochlorite, preferably sodium hypochlorite, ozone, or oxygen gas, sodium periodate and mixtures of either two or more thereof, preferably hypochlorite.

Before collecting the chemically modified polysaccharide, it can be neutralized The neutralisation step can take place in any vessel but might occur in the microdevice as well. Preferably, the neutralisation is taking place with an acid. The preferred acids are edible acids (food grade acids) such as phosphoric acid, citric acid, malic acid, succinic acid, adipic acid, gluconic acid, tartaric acid, fumaric acid and mixtures thereof. Particularly preferred are citric acid and/or phosphoric acid. Other acids such as mineral acids that could also be used are (but not limited to) hydrochloric acid, sulphuric acid, sulphurous acid, boric acid, polyphosphoric acid, pyrophosphoric acid; or mixtures thereof.

Furthermore, before collecting the chemically modified polysaccharide or the neutralised chemically modified polysaccharide, it can be cooled by any means, but preferably by using a micro heat exchanger.

Furthermore the current invention relates specifically to a process wherein the polysaccharide is starch.

In a specific embodiment, the current invention relates to a process for preparing a chemically modified starch and said process is comprising the following steps:
  a. Taking a slurry comprising starch
  b. Adjusting pH to allow a chemical reagent to react with the starch in the slurry,
  c. Injecting the slurry through a microdevice
  d. Adding through the microdevice a chemical reagent selected from the group consisting of a cross-linking agent, an esterification agent, etherification agent, oxidation agent and or a mixture thereof,
  e. Collecting chemically modified starch Specific examples of suitable chemical reagents are acetic anhydride, propylene oxide, sodium hypochlorite and the like. The slurry of starch has a dry matter content of 20 to 50%, preferably around 40%.

The current invention further relates to a process for preparing a chemically modified polysaccharide and said process is comprising the following steps:
  a) Taking a slurry comprising polysaccharide
  b) Adjusting pH to allow a chemical reagent reacting with the polysaccharide in the slurry of step a),
  c) Adding a etherification agent, and a cross-linking agent to react with the polysaccharide in the slurry of step a)
  d) Neutralising with acid,
  e) Collecting chemically modified polysaccharide Characterized in that the whole process is taking place in a microdevice. The order of adding the etherification agent, and the cross-linking agent is not important and is interchangeable. The whole process can take place in a microdevice or single steps can be performed in a microdevice. At least the chemical modification step is taking place in a microdevice. Preferably the polysaccharide is starch and after activation (is adjusting pH) the starch is hydroxypropylated in a microdevice followed by adding the cross-linking agent. The activated starch may react with a cross-linking agent followed by hydroxypropylation. Upon finalisation of the chemical modification, the chemically modified starch can be neutralised and cooled in any vessel, but preferably in a microdevice.

The current invention further relates to the use of microdevice for the chemical reaction of polysaccharides with a chemical reagent selected from the group consisting of an cross-linking agent, an esterification agent, etherification agent, oxidation agent and a mixture of two or more thereof, in an heterogeneous medium, preferably the polysaccharide is starch.

The heterogeneous medium is selected from a dispersion, or a suspension. A dispersion is a system in which particles are dispersed in a continuous phase of a different composition. A suspension is a heterogeneous fluid containing solid particles that are sufficiently large for sedimentation. Usually they must be larger than 1 micrometer. The internal phase (solid) is dispersed throughout the external phase (fluid) through mechanical action, with the use of certain excipients or suspending agents. A colloid is a type of chemical mixture where one substance is dispersed evenly throughout another. The particles of the dispersed substance are only suspended in the mixture, unlike a solution, where they are completely dissolved within. This occurs because the particles in a colloid are larger than in a solution but small enough to be dispersed evenly and maintain a homogeneity appearance, but large enough to scatter light and not dissolve. A colloidal system consists of two separate phases: a dispersed phase (or internal phase) and a continuous phase (or dispersion medium).

The invention will hereunder be illustrated in the form of the following examples.

EXAMPLES

Example 1

Acetylation Reaction

A 1% caustic solution (0.1 mN NaOH) [24.7 g/min.] that is kept at 5° C. is reacted with a 40 wt % of waxy starch [Cargill C*Gel04201] slurry [100 g/min.] in a microreactor type Starlam® 30 at ambient temperature (20° C.). pH measured at the outlet of the microreactor was 8.2. The activated starch is then reacted with pure acetic anhydride [0.41 g/min.] at 40° C. in a second microreactor Starlam® 30 unit for 30 seconds after what the reaction mixture is quickly passed over a Buchner filter, the resulting material was then washed with distilled water. This operation was repeated 3 times. The wet starch cake was then dried under vacuum for 30 minutes and stored for analysis.

The analytical results showed that the esterified starch had total acetyl content of 0.28%, which correspond to 64.8% acetic anhydride conversion.

Example 2

Oxidation Reaction

A 12% sodium hypochlorite (26.9 mmoles NaOCl [16.7 g/min.] that is kept at 5° C. is reacted with a 40 wt % of waxy starch [Cargill C*Gel04201] slurry [100 g/min.] in a microreactor type Starlam® 30 at 20° C. pH measured at the outlet of the microreactor was 5.88.

0.49 g of sodium bisulfate was added to the oxidized starch slurry and stirred for 20 minutes. At that point pH was measured and adjusted to 5 by addition of caustic (0.1 mN NaOH). The neutralized reaction mixture was then quickly passed over a Buchner filter; the resulting material was then washed with distilled water. This operation was repeated 3 times. The wet starch cake is then dried under vacuum for 30 minutes and stored for analysis.

The analytical results showed that the oxidized content was 0.38%.

A common reaction without microreactor would last for at least 3 hours.

Example 3

Phosphorylated Starch Preparation

A 25% caustic solution (0.1 mN NaOH) [5.8 g/min.] that is kept at 5° C. is reacted with a 37 wt % of waxy starch [Cargill C*Gel04201] slurry [250 g/min.] in a microreactor type CPMM® 1200 at ambient temperature for 20 seconds. pH measured at the outlet of the microreactor was 11.5. The activated starch is then reacted with pure phosphoryloxychloride [0.112 g/min.] at 22° C. in a T-type micromixer unit for 4 seconds after what the reaction mixture is further reacted with pure propylene oxide [12.5 g/min.] at 30° C. for 5 seconds before being neutralized with a 10% hydrochloric acid solution. The neutralized solution was then passed over a filter; the resulting material was then washed with distilled water. This operation was repeated 3 times. The wet starch cake is then dried under vacuum for 30 minutes and stored for analysis.

The analytical results showed that the HP starch had total hydroxypropyl content of 0.36%.

A common reaction without microreactor is lasting for several hours, even up to 20 hours.

Example 4

Hydroxypropylated Starch Preparation

A 15% caustic solution (0.1 mN NaOH) [5.22 g/min.] is reacted with a 30 wt % of waxy starch [Cargill C*Gel04201] slurry [200 g/min.] in a microreactor type CPMM® 1200 at 40° C. for 30 seconds. The activated starch is then reacted with pure propylene oxide [9 g/min.] at 40° C. in a StarLam30-type micromixer unit for 41 seconds after what the reaction mixture is kept at 40° C. for 6 hours before being neutralized with a 10% hydrochloric acid solution. The neutralized solution was then passed over a filter; the resulting material was then washed with distilled water. This operation was repeated 3 times. The wet starch cake is then dried under vacuum for 30 minutes and stored for analysis.

The analytical results showed that the HP starch had total hydroxypropyl content of 1.46%.

The invention claimed is:

1. A process for preparing a chemically-modified polysaccharide, the process comprising:
   a) taking a heterogeneous slurry comprising a polysaccharide;
   b) activating the polysaccharide by adjusting the slurry pH to allow a chemical reagent to react with the polysaccharide in the slurry of step a);
   c) injecting the slurry through a microdevice;
   d) adding through the microdevice a chemical reagent selected from the group consisting of a cross-linking agent, an esterification agent, an etherification agent, an oxidation agent, and a mixture of two or more thereof, to react with the polysaccharide in the slurry of step a); and
   e) collecting the chemically-modified polysaccharide.

2. The process of claim 1, wherein the polysaccharide is a starch.

3. The process of claim 1, wherein between steps d) and e) the chemically-modified polysaccharide is neutralized in a microdevice.

4. The process of claim 1, wherein the etherification agent is a hydroxypropylation agent, an ethylation agent, or a cationisation agent.

5. The process of claim 1, wherein the esterification agent is an acetylation agent.

6. The process of claim 1, wherein the oxidation agent is a hypochlorite.

7. The process of claim 1, wherein the cross-linking agent is selected from the group consisting of dichloropropylene, a phosphorylation agent, adipic acid, fumaric acid, maleic acid, fumaric anhydride, maleic anhydride, and adipic anhydride.

8. The process of claim 1, the process comprising:
   a) taking a heterogeneous slurry comprising a polysaccharide;
   b) activating the polysaccharide by adjusting the slurry pH to allow a chemical reagent to react with the polysaccharide in the slurry of step a);
   c) adding an etherification agent and a cross-linking agent to react with the polysaccharide in the slurry of step a);
   d) neutralizing with acid; and
   e) collecting the chemically-modified polysaccharide, wherein the process steps take place in a microdevice.

9. A method of using a microdevice for carrying out a chemical reaction, the method comprising: combining in a microdevice a polysaccharide with a chemical reagent selected from the group consisting of a cross-linking agent, an esterification agent, an etherification agent, an oxidation agent, and a mixture of two or more thereof, in a heterogeneous medium.

10. The method of claim 9, wherein the heterogeneous medium is a dispersion or a suspension.

11. The process of claim 1, wherein the etherification agent is a hydroxypropylation agent.

12. A process for preparing a chemically-modified polysaccharide, the process comprising:
   a) taking a heterogeneous slurry comprising a polysaccharide;
   b) injecting the slurry through a microdevice;
   c) activating the polysaccharide by adjusting the pH of the slurry in the microdevice of step b) to allow a chemical reagent to react with the polysaccharide in the slurry of step a);
   d) injecting through a microdevice a chemical reagent selected from the group consisting of a cross-linking agent, an esterification agent, an etherification agent, an oxidation agent, and a mixture of two or more thereof, to react with the polysaccharide in the slurry of step a); and
   e) collecting the chemically-modified polysaccharide, where the microdevice in step d) is the same or different than the microdevice in step b), with the proviso that when the microdevice in step d) is different than the microdevice in step b), then the activated slurry is injected into the microdevice of step d).

* * * * *

UNITED STATES PATENT AND TRADEMARK OFFICE
CERTIFICATE OF CORRECTION

PATENT NO. : 8,686,132 B2
APPLICATION NO. : 13/394860
DATED : April 1, 2014
INVENTOR(S) : Marc Charles Florent Berckmans et al.

Page 1 of 1

It is certified that error appears in the above-identified patent and that said Letters Patent is hereby corrected as shown below:

On the Title Page, in column 2, References Cited under "OTHER PUBLICATIONS" in line 11, delete "3281," and insert -- 3291, --, therefor.

Signed and Sealed this
Fifth Day of August, 2014

Michelle K. Lee
*Deputy Director of the United States Patent and Trademark Office*